July 14, 1964  J. E. NOLL  3,141,005
PROCESS FOR PRODUCING PHENOL-FORMALDEHYDE RESINS
Filed Oct. 7, 1959

WITNESSES

INVENTOR
John E. Noll
BY
ATTORNEY

United States Patent Office 3,141,005
Patented July 14, 1964

3,141,005
PROCESS FOR PRODUCING PHENOL-
FORMALDEHYDE RESINS
John E. Noll, Monroeville, Pa., assignor to Westinghouse Electric Corporation, East Pittsburgh, Pa., a corporation of Pennsylvania
Filed Oct. 7, 1959, Ser. No. 844,894
1 Claim. (Cl. 260—59)

This invention relates to a resinous composition, to the method of preparing the same, and to electrical conductors insulated therewith.

This invention is directed to a resinous enamel composition particularly adapted for use in the insulation of electrical conductors. The resinous composition comprises a phenol-aldehyde resin prepared in a novel manner and a polyvinylal resin. This invention is also directed to insulated electrical conductors having insulation of the organic enamel type thereon, said organic enamel being the resinous composition of this invention.

For a complete understanding of this invention, reference is made to the following detailed description and drawing, in which.

Figure 1:
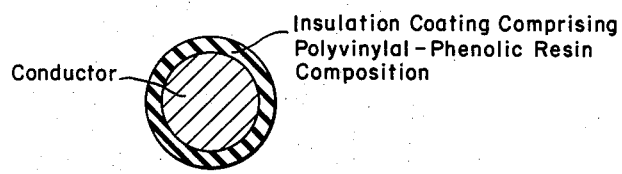
FIGURE 1 is a cross-sectional view of an electrical conductor provided with insulation in accordance with this invention.

In accordance with this invention, metallic conductors are insulated with resinous composition produced by suitably combining a resinous condensation product of an aldehyde and a partially or completely hydrolyzed polymerized vinyl ester with a phenol-aldehyde resin, which phenol-aldehyde resin is prepared in a novel manner to be described more fully hereinafter. The insulation on the conductor is hard, tough, flexible, has good resistance to abrasion and moisture, good resistance to attack by oil, varnish, and the like. It has a low power factor and high dielectric strength.

More specifically, the resinous composition of this invention can be applied to wire conductors at a much greater speed than heretofore possible by employing the prior art wire enamels. The composition also has excellent shelf-life.

The resinous hydrolyzed polymerized vinyl ester-aldehyde condensation products referred to above are disclosed in Reissue Patent No. 20,430 to Morrison et al., and, as set forth in said patent, may be prepared from various polyvinyl esters and various aldehydes. This class of resins is designated in the art as "polyvinylal resins."

A polyvinylal resin suitable for use in this invention can be prepared as set forth in the following example. All parts are by weight unless otherwise indicated.

*Example I*

One hundred parts of a polymerized vinyl acetate are dissolved in 185 parts of glacial acetic acid. To this solution there are added 83 parts of 37% aqueous formaldehyde and 6.8 parts of concentrated sulfuric acid (98%). Mineral acids other than sulfuric acid may be employed. Examples of such other mineral acids include hydrochloric acid and phosphoric acid. Hydrolysis is carried out at about 70° C. in an enameled vessel. Samples of the reaction mixture are removed at various intervals of time and analyzed for their formaldehyde content. The results of these analyses indicate the extent to which the polyvinyl ester has been converted into polyvinyl formal. When the desired degree of conversion has been effected, a suitable amount of neutralizing agent, for example 13 parts of concentrated ammonia, is added to the reaction vessel. The neutralized mass is poured as a thin stream into water, whereupon the reaction product is precipitated in the form of threads. The threadlike material is washed with water and dried in a current of warm air (60° C.). The dried threads are white.

Aldehydes other than formaldehyde can be employed in preparing polyvinylal resins. Examples of other aldehydes that can be employed include acetaldehyde, propionaldehyde, butyraldehyde and benzaldehyde. Polyvinyl esters other than polyvinyl acetate can be employed such, for example, as polyvinyl propionate and polyvinyl butyrate. The properties of the polyvinylal resins can be varied through a wide range by varying the viscosity and the extent of the hydrolysis of the polyvinyl ester, the amount and the character of the aldehyde reacted with the hydrolyzed polymerized vinyl ester, and the character and the amount of the acid catalyst used.

The phenol-aldehyde resin employed in the resinous composition of this invention can be prepared by reacting phenol (hydroxybenzene), cresol, or cresylic acid with formaldehyde, paraformaldehyde, or other polymers of formaldehyde well known in the art. Other aldehydes can be employed if desired. Examples of such aldehydes are acetaldehyde, propionaldehyde, butyraldehyde. As is well known in the art, cresylic acid comprises a mixture of varying compositions of cresols and xylenols. Commercial cresylic acid contains a small amount of phenol, the three cresols and considerable amounts of higher phenols including the several xylenols.

The phenol-aldehyde resin employed in the resinous composition of this invention is prepared by reacting 1 mol of phenol and from about 0.7 mol to 2.0 mols of aldehyde, preferably formaldehyde, in a closed reaction vessel at atmospheric pressure and at the boiling point (from about 95° C. to 100° C.) for a period of time of at least one hour, the reaction being catalyzed by an alkaline catalyst, such as triethanolamine or morpholine.

The phenol, the aldehyde and the catalyst are charged into a suitable reaction vessel and are stirred and reacted at atmospheric pressure at the boiling point, usually from about 95° C. to 100° C. The reaction is allowed to proceed until incipient precipitation of the resin occurs, which is indicated by the cloudiness of the solution. Ordinarily it will require a period of time of about 1 hour to 2 hours to reach this point. At this point there is added to the reaction mass a cation exchange resin, preferably a strong acid type, in at least a stoichiometric amount with respect to the catalyst to effect substantially complete neutralization of said catalyst. A slight excess of cation exchange resin may be employed if desired, it being understood that this excess has no untoward effects and will be subsequently removed by filtration. The resultant mass containing the cation exchange resin is agitated, as by stirring, to insure neutralization of the catalyst, and is then dehydrated, preferably under reduced pressure with the external application of heat to remove substantially all the water therefrom. The resinous reaction product and the beads of cation exchange resin are then separated, preferably by filtration, and the beads discarded. The beads of cation exchange resin can be removed from the reaction mass prior to dehydration if desired. The preferred method being to remove them after dehydration.

The cation exchange resin employed in the preparation of the phenol-aldehyde resin for use in preparing the resinous composition of this invention removes substantially all the catalyst employed in the preparation of the resin from the reaction mass. Phenol-aldehyde resins in which the catalyst has been removed therefrom in the manner hereinabove described, and which are employed in the resinous compositions of this invention, provide resinous compositions having improved shelf life. Furthermore, it has been determined that in coating electrical conductors with the resinous composition of this invention, the coating speed can be increased substantially over the coating speed required for resinous compositions comprising the prior art phenol-aldehyde resins.

Cation exchange resins suitable for use in carrying out this invention are sulfonated phenol-formaldehyde resins containing sulfonic acid radicals attached to the aromatic nucleus or to an aliphatic portion of the molecule, sulfonated tannin-formaldehyde resins, and sulfonated copolymers of divinyl-benzene and styrene. Suitable cation exchange resins that may be employed in the preparation of the novel phenol-aldehyde resin of this invention are available commercially under the proprietary names Amberlite IR–120, Dowex–50 and Dowex–50W.

The following example is illustrative of the preparation of a phenol-aldehyde resin for use in wire enamel resin compositions by prior art methods. All parts are by weight unless otherwise indicated.

*Example II*

| | Parts |
|---|---|
| Cresol (50% to 55% meta-cresol, balance being para-cresol and xylenols) | 1000 |
| Formaldehyde (37%) | 598 |
| Triethanolamine | 32 |

The above materials are placed in a steam heated reaction vessel fitted with a stirrer and a reflux column and heated at atmospheric pressure at the boiling point (approximately 98° C.) for a period of about 1½ hours. The reaction mass is then vacuum dehydrated under a vacuum of about 25 mm. of mercury with external application of heat. The temperature is increased gradually until the temperature of the reaction mass reaches about 90° C., at which temperature the dehydration is stopped. The resin is cooled to room temperature and there is added an amount of meta-para-cresol to provide a resin varnish having a resin solids content of about 50%.

The following two examples are illustrative of the preparation of phenol-aldehyde resins in accordance with this invention. All parts are by weight unless otherwise indicated.

*Example III*

| | Parts |
|---|---|
| Cresol (a mixture containing approximately 50% to 55% meta-cresol, the remainder being para-cresol and xylenols) | 1000 |
| Formaldehyde (37%) | 598 |
| Triethanolamine (commercial grade) | 32 |

These materials are reacted in a steam heated reaction vessel in the same manner as that described in Example II above for about 1½ hours. At this point 83 parts of Amberlite IR–120 in the form of small beads is added to the kettle and the ingredients are stirred for a period of time of about 15 minutes. Amberlite IR–120 is a commercially available cation exchange resin prepared by the sulfonation of phenol-formaldehyde resin beads. The resinous mass is then vacuum dehydrated in the same manner as that described in Example II. A resinous varnish is prepared therefrom by adding thereto meta-para-cresol in an amount sufficient to provide a resinous varnish having a resin solids content of about 50%. The beads of the cation exchange resin are then removed from the varnish by filtration. The resulting varnish is substantially free of all catalyst.

*Example IV*

The same ingredients and the same procedure as that described in Example III above are employed to produce a catalyst-free resin, with the exception that in place of the triethanolamine, 32 parts of morpholine is used as a catalyst. The dehydrated resin is a clear, amber viscous liquid. Sufficient meta-para-cresol is added to the resin to provide a resinous varnish having a resinous solids content of about 50%.

The following example is again illustrative of the preparation of a prior art phenol-aldehyde resin. All parts are by weight.

*Example V*

| | Parts |
|---|---|
| Phenol | 750 |
| Formaldehyde (37%) | 644 |
| Triethanolamine (commercial grade) | 26 |

Substantially the same procedure as that employed in the preparation of the resin of Example II is employed to prepare a resin, which, in dehydrated form, is a clear, amber solid. A resinous varnish composition is prepared from this dehydrated resin by adding thereto an amount of meta-para-cresol to provide a resinous varnish having a resinous solids content of about 50%.

The example below is illustrative of the preparation of the catalyst-free resin of this invention. All parts are by weight.

*Example VI*

| | Parts |
|---|---|
| Phenol | 750 |
| Formaldehyde (37%) | 644 |
| Triethanolamine (commercial grade) | 26 |

Substantially the same procedure as that described in Example III above is employed in making a resin which, in dehydrated form, is a clear, amber solid. In this method, as in the method described in Example III, 68 parts of Amberlite IR–120 is employed to remove substantially all of the remaining catalysts from the resinous mass.

*Example VII*

Example VI is repeated using the same ingredients and the same general procedure with the exception that in place of the Amberlite IR–120 there is employed 68 parts of Dowex–50. Dowex–50 is a cation exchange resin prepared by the nuclear sulfonation of styrene-divinylbenzene resin beads. The dehydrated resin is a clear, amber solid. Meta-para-cresol is added to the dehydrated resin to form a resinous varnish having a resinous solids content of about 50%.

*Example VIII*

A polyvinylal resin varnish is prepared by dissolving two parts by weight of commercially available Formvar E in 8.8 parts by weight of naphtha and 6 parts by weight of solvent grade cresylic acid. Formvar E is a polyvinylal resin produced by reacting formaldehyde with a product of hydrolysis of polyvinyl acetate. The solvent naphtha employed is a crude coal-tar naphtha commonly known in the trade as "No. 100 heavy naphtha" and also known as "wire enamel naphtha." Such naphtha usually has a distillation range of 155° C. to 290° C., with 75% to 85% distilling off at about 200° C. Two parts by weight of the resin varnish of Example II is thoroughly admixed with the polyvinylal resin varnish to provide a resinous varnish composition having a resins solids content of about 16%. This resinous varnish composition was used to coat #16 AWG copper wire using conventional wire coating procedures. The maximum speed at which the wire could be satisfactorily coated was 24 feet per minute.

Other polyvinylal-phenolic resin varnish compositions are prepared using as the phenolic portion thereof the several phenol-aldehydre resins of the other examples above. These varnish compositions are employed to coat AWG #16 copper wire and various coating speeds are used during coating to determine the maximum coating speed at which satisfactory coatings can be applied. The results of these determinations indicate that wire can be coated at greater speeds by employing a varnish composition in which the phenolic portion thereof is prepared in accordance with this invention than by employing varnish compositions in which the phenolic content is prepared by prior art methods. Coating speeds can be increased by about 125% by following the teachings of this invention. It will be obvious to those skilled in the art the great advantages to be obtained by such increase in coating speed.

While it is preferred to employ as the solvent mixture with the resinous varnish composition of this invention a mixture of meta-para-cresol and crude, heavy solvent naphtha, preferably in an amount of 30 parts by weight of meta-para-cresol and 70 parts by weight of naphtha, other solvent mixtures can be employed. The solvent can be a mixture of a suitable hydrocarbon, such as benzene or toluene, and an hydroxy compound compatible therewith, for example, a compatible aromatic alcohol such as benzyl alcohol or a compatible monatomic saturated alcohol as, for example, methyl, ethyl, n-propyl, n-butyl, n-amyl, hexyl (2-ethylbutanol), and octyl (2-ethylhexanol). The solvent can comprise an aromatic or other suitable hydrocarbon and a mixture of two or more alcohols or other hydroxy compounds compatible with the hydrocarbon used. The percentage by weight of alcohol in the solvent mixture may vary, for instance, from approximately 20% to 40%, the other 80% to 60% being either benzene or toluene. A specific example is 25% ethyl alcohol and 75% toluene. With above alcohols, xylene or any of the higher boiling aromatic hydrocarbons cannot be substituted for the benzene or toluene in the solvent mixture. However, when the hydroxy compound is a phenolic body, such as cresol, xylenols and the like, benzene, toluene, xylene or any of the high-flash or other solvent naphthas commonly used in making wire enamels may be used.

Enameled wires are produced by drawing the clean wire, for example, clean copper wire, through a bath of the resinous varnish composition or wire enamel prepared by incorporating the phenol-aldehyde resin with a polyvinylal resin and a solvent. The proportions of phenol-aldehyde resin and polyvinylal resin may be varied, for example, by weight, from 5 to 50 parts phenol-aldehyde resin to from 95 to 50 parts polyvinylal resin. The total resin to solvent proportions may also be varied, for instance, from 5 to 25 parts resin to from 95 to 75 parts solvent.

After the wire is passed through a bath containing the resinous varnish composition or wire enamel of this invention, the coated wire is subjected to heat, for instance, by introducing it into a suitable oven or chamber wherein the enamel coating is baked at a suitable temperature, for example, at an oven temperature of about 200° C. to 500° C. Usually it is necessary to run the wire successively through the enamel bath and baking oven several times in order to provide adequate insulation thereon. Baking advances the phenol-aldehyde component of the mixed or combined resin film to the insoluble, infusible state and likewise improves the properties of the polyvinylal resin component. Specifically, the hardness, abrasion resistance and resistance of the resin film to attack by oils, solvents, varnishes and various chemicals are improved by such treatment.

Figure 2:
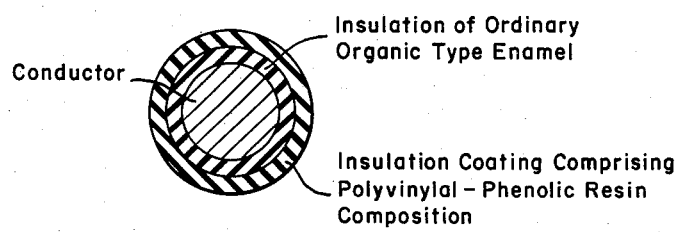
FIG. 2 is a cross-sectional view showing an electrical conductor provided with a coating of insulation of ordinary organic type enamel and the insulating resinous composition of this invention.
Figure 3:
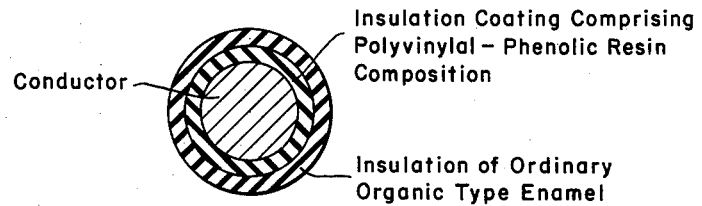
FIG. 3 is a cross-sectional view illustrating another modification of this invention.
Figure 4:
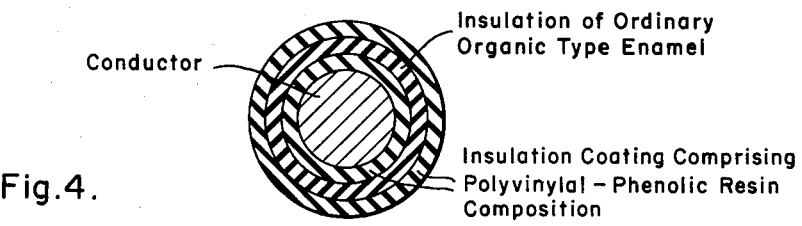
FIG. 4 is a cross-sectional view showing a still further modification of this invention.

It is to be understood that this invention is not limited to the application of the new insulating composition directly upon the conductor, as shown in FIG. 1 of the drawing. For example, a coating of the new insulation can be applied over a coating of regular enamel, as shown in FIG. 2 of the drawing. The modified polyvinylal resin adheres tenaciously to the underlying enamel film, and protects the later from abrasion and from embrittlement which otherwise results upon prolonged exposure to heat. Also, if desired, a conductor can be provided first with a coating of the polyvinylal-phenolic resin compositoin, followed by one or more coatings of ordinary enamel, as shown in FIG. 3 of the drawing. In this way the adherence of the ordinary organic enamel is improved. Thereafter an outer coating or coatings of the polyvinylal-phenolic resin composition can be put on, as shown in FIG. 4 of the drawing.

While the preparation of the phenol-aldehyde resin which is incorporated with the polyvinylal resin has been described with particular reference to phenol and cresol, it will be obvious to those skilled in the art that other phenolic bodies also can be used. For example, xylenols can be used; or mixtures of phenol and cresol; or phenol and cresol together with wood oil phenolic bodies of the kind described in Patent 2,221,511 to Fiedler et al. Likewise, active methylene-containing bodies other than formaldehyde can be used, either in solid or solution state. If desired, para-formaldehyde can be employed in place of an aqueous solution of formaldehyde and the reaction and dehydration can be carried out in an open vessel instead of as described under Example III. While it is preferred to use an organic alkaline catalyst such as ethanolamines, specifically triethanolamine, or morpholine, inorganic alkaline catalyst also can be employed, for example, hydroxides and carbonates of the alkali metals as, for instance, sodium or potassium hydroxide, or carbonate.

Although the polyvinylal-phenolic resin composition herein described is particulary applicable to the manufacture of wire enamels and insulated conductors, it will be appreciated that its field of utility is not limited thereto. For example, it can be used as an adhesive for cementing together such materials as micaflakes to form bonded mica sheet insulation by procedures well known in the art. It can also be used as a cementing agent for bonding together fibrous materials in sheet, tape, felted, or other form. It can also be employed as a coil-impregnating varnish.

The polyvinylal-phenolic resin composition can be made in the form of thin sheets or tapes and used alone, or adhesively bonded to, or otherwise in combination with other materials such as paper, cellulose esters, cellulose ethers, etc., as coil layer insulation. Such sheets or tapes can also be applied to a conductor, according to well-known strip-covering methods, as insulation therefor. They can be heat treated to improve their properties either before, during or after application.

By employing in admixture with polyvinylal resins, the phenol-aldehyde resin prepared in accordance with this invention there is provided a resinous varnish composition or wire enamel that can be coated on wire at a greater speed than heretofore possible by using phenol-aldehyde resins prepared in a manner wherein the catalyst, such as the triethanolamine of Example II, is not removed from the phenol-aldehyde resin prior to incorporation of that resin with the polyvinylal resin. Furthermore, the resin varnish composition of this invention has longer shelf-life than the prior art varnishes.

Wire insulated with the resin composition of this invention has good flexibility at 25° C., good heat shock resistance, high dielectric strength, good abrasion and solvent resistance, and good resistance to aging under heat.

It is to be understood that the above description and

I claim as my invention:

In the process of producing a phenol-formaldehyde resin, the steps comprising refluxing one mol of a phenol selected from at least one of the group consisting of hydroxy benzene, cresol, and cresylic acid and from 0.7 mol to 2 mols of an aldehyde selected from the group consisting of formaldehyde and polymers of formaldehyde in the presence of an alkaline catalyst selected from the group consisting of triethanolamine and morpholine for a period of time of from 1 hour to 2 hours to provide a reaction mass, admixing and agitating with the reaction mass a cation exchange resin in at least a stoichiometric amount based on the alkaline catalyst, and removing the cation exchange resin and water from the reaction mass.

References Cited in the file of this patent

UNITED STATES PATENTS

| | | |
|---|---|---|
| 2,307,588 | Jackson et al. | Jan. 5, 1943 |
| 2,865,875 | Hyman et al. | Dec. 23, 1958 |